(12) United States Patent
Kishi et al.

(10) Patent No.: US 6,841,103 B2
(45) Date of Patent: Jan. 11, 2005

(54) INJECTION MOLDING APPARATUS AND METHOD

(75) Inventors: Shinsuke Kishi, Saitama (JP); Hideaki Yoshimura, Shizuoka (JP)

(73) Assignee: Sony Disc Technology Inc. (JP)

( * ) Notice: Subject to any disclaimer, the term of this patent is extended or adjusted under 35 U.S.C. 154(b) by 343 days.

(21) Appl. No.: 09/778,805

(22) Filed: Feb. 8, 2001

(65) Prior Publication Data

US 2001/0019183 A1 Sep. 6, 2001

(30) Foreign Application Priority Data

Feb. 9, 2000 (JP) ...................................... P2000-038115

(51) Int. Cl.$^7$ .......................... B29C 45/77; B29C 45/80
(52) U.S. Cl. .................. 264/40.5; 264/328.8; 425/145; 425/150; 425/572
(58) Field of Search .............................. 264/40.1, 40.5, 264/328.8; 425/145, 150, 575, 572, 588

(56) References Cited

U.S. PATENT DOCUMENTS

| | | | | |
|---|---|---|---|---|
| 5,176,859 A | * | 1/1993 | Leffew | 425/149 |
| 5,375,991 A | * | 12/1994 | Rydmann et al. | 425/144 |
| 5,451,363 A | * | 9/1995 | Minamimura et al. | 425/589 |
| 5,756,019 A | | 5/1998 | Nakazawa | |
| 5,766,526 A | | 6/1998 | Watanabe | |
| 5,776,407 A | * | 7/1998 | Takeda | 425/575 |
| 6,464,909 B1 | * | 10/2002 | Kazmer et al. | 425/149 |
| 6,562,264 B1 | * | 5/2003 | Taniguchi et al. | 264/328.7 |

FOREIGN PATENT DOCUMENTS

| | | |
|---|---|---|
| DE | 29909535 | 8/1999 |
| JP | 62-018234 | 1/1987 |
| JP | 04-169217 | 6/1992 |
| WO | 93-01926 | 7/1991 |

* cited by examiner

Primary Examiner—Jill L. Heitbrink
(74) Attorney, Agent, or Firm—Ronald P. Kananen; Rader, Fishman & Grauer PLLC

(57) ABSTRACT

The present invention is directed to an injection molding apparatus and method capable of preventing the occurrence of over-packing. The apparatus includes a pair of dies for forming a plurality of cavities therebetween; die closing devices for closing the pair of dies under a prescribed pressure; an injection device for injecting a molten resin into respective cavities under a prescribed pressure; and, a control device for controlling the die closing devices and the injection device. Further, the apparatus comprises a plurality of pressure sensors for detecting respective pressures in respective cavities and a control device that controls the injection device and/or the die closing devices to reduce the rate of injection of the molten resin and/or the force of closing the dies and, otherwise, stops the injection and/or the die closing operation when the pressure difference between cavities is found to be greater than a prescribed value on the basis of sensed values from the respective pressure sensors.

6 Claims, 4 Drawing Sheets

INJECTION MOLDING APPARATUS AND METHOD

BACKGROUND OF THE INVENTION

1. Field of the Invention

The present invention relates to an injection molding apparatus for molding a plurality of disc substrates, such as those used for an optical disc, and a molding method therefor.

2. Description of the Related Art

Conventionally, in order to mold a plurality of disc substrates, such as for an optical disc, it is practiced that a die having a plurality of cavities for forming a plurality of disc substrates is used, and a molten resin is injected into each cavity of the die to mold each disc substrate thereof.

In this method, however, there occurs a problem of a so-called over-pack, which results from clogging in a part of its injection piping communicating to any one of the cavities, thereby forcing the molten resin to bypass the clogged cavity and flow to another cavity, so as to over-pack the same with an excessive quantity of the molten resin. If such an over-packing occurs, the molten resin infiltrates into a gap of a parting surface of the die. In order to remove this infiltrated resin, maintenance work is required, which includes dismounting of the die from the molding machine, disassembling and cleaning thereof.

Thereby, there are such disadvantages associated with the related art that, not only is a continuous operation of the molding machine interrupted, in a case of molding a high density optical disc, such as a DVD or the like which requires a very high dimensional precision, because precision of a die closing device of the molding machine is deteriorated by disassembly, precision adjustment is further required, thereby resulting in a significantly prolonged downtime.

Further, there is such a problem that the die may be broken by the occurrence of the over-packing, or a stamper may drop and be broken during maintenance work, thereby largely delaying the delivery of the mold products to the customers.

SUMMARY OF THE INVENTION

An object of the present invention is to solve the above-mentioned problems associated with the conventional art, and provide a multi-cavity molding machine and a method therefor in which the occurrence of over-packing is prevented.

The above-mentioned object of the present invention is accomplished by provision of an injection molding apparatus embodying features according to first, second and third aspects of the present invention, the apparatus being comprised of: at least a pair of dies arranged to be openable and closable for forming a plurality of cavities therebetween when closed; a die closing device for closing the pair of dies under a prescribed pressure; an injection device for injecting a molten resin under a prescribed pressure into each cavity formed between the pair of dies when they are closed; and a control device for controlling the above-mentioned die closing device and the injection device, in which a plurality of pressure detection devices are provided for detecting a pressure within each cavity, wherein the control device controls the injection device and/or the die closing device so as to reduce a rate of injection of the molten resin and/or a force of closing the dies in order to stop the injection of the molten resin and/or application of the die closing force when the pressure difference between respective cavities is found to be larger than a predetermined value on the basis of detected values from the respective pressure detection devices.

Further, in the foregoing apparatus having the feature according to the above-described aspects of the invention, when clogging occurs in an injection pipe communicating with any one of the cavities at the time of injecting a molten resin into respective cavities by means of the injection device, a quantity of injected resin in the cavity in the downstream of the clogged pipe decreases or becomes zero, thereby lowering a pressure within the cavity in comparison with a pressure within other cavities. Therefore, when it is learned on the basis of the detected values sent from respective pressure detection devices that a pressure difference between any two of the cavities becomes greater than a prescribed value, the control device controls the injection device and/or die closing device so as to reduce a rate of injection of the molten resin and/or a force of closing the dies.

Thereby, as a result of a decrease in the rate of injection of the molten resin from the injection device, an over-pack in any other cavities can be prevented.

The control device referred to here may control either the injection device and the die closing device separately or both of them concurrently so as to reduce the rate of injection of the molten resin and/or the force of closing the dies.

According to another feature according to a fourth aspect of the invention, in a case where the above-mentioned control device is designed to execute its control over the injection device and the die closing devices on the basis of a program which is capable of setting injection/pressure conditions which are effective only for an initial step of molding after start of operation in a continuous operation, the control device is to execute its control of any initial molding after start of operation in accordance with the above-mentioned program even in an automatic operation in the same way as in the continuous operation.

According to still another feature according to a fifth aspect of the invention, when the control device controls the injection device, at a first molding in an injection molding operation, to inject a quantity of a molten resin which is 1/n or less compared with a quantity thereof at a second and subsequent moldings, provided that there exist n cavities, the occurrence of over-packing is prevented even if clogging occurs in the injection piping communicating with respective cavities.

The above-mentioned object of the invention is accomplished by provision of an injection molding apparatus having a feature according to a sixth aspect of the invention, which is comprised of: at least a pair of dies arranged to be openable and closable for forming a plurality of cavities therebetween when closed; a die closing device for closing the pair of dies under a prescribed pressure; an injection device for injecting molten resin into respective cavities under a prescribed pressure; and a control device for controlling the above-mentioned die closing device and the injection device, wherein the control device executes its control on the basis of a program which is capable of setting injection/pressure conditions which are effective only for an initial step of molding after start of operation.

Further, in the above-mentioned apparatus having the feature according to the sixth aspect of the invention, in contrast to the invention of the first to the third aspects in which the pressure difference between respective cavities is required to be obtained, when the control device in the former executes its control on the basis of the program capable of setting the injection/pressure conditions effective only for the initial step of molding after a start of operation without acquisition of the pressure difference between respective cavities, a safe operation of molding is ensured, at least for the initial step of molding after the start of operation, by setting a safety condition to avoid the occurrence of over-packing through control of the quantity of resin to be charged and the die closing force.

According to a feature of the invention according to a seventh aspect of the invention, in the structure of the sixth aspect of the invention, the occurrence of over-packing is further avoided by having the above-mentioned control device control the injection device to inject a limited quantity of a molten resin at a first molding in its injection molding operation in the amount of 1/n or less compared with a quantity of injection thereof at a second and subsequent molding, in a case where the number of cavities is n.

Still further, the above-mentioned object of the invention can be achieved by provision of a multi-cavity molding method having a feature according to an eighth aspect of the invention comprising the steps of: while injecting a molten resin for molding into respective cavities formed in a pair of dies, sensing each pressure within respective cavities; and reducing a die closing force when a pressure difference among respective cavities exceeds a predetermined value.

As described hereinabove, according to the invention, the multi-cavity molding apparatus and the method thereof capable of preventing the occurrence of over-packing have been provided.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

PREFERRED EMBODIMENT OF THE INVENTION

A preferred embodiment of the present invention will be described in details with reference to FIGS. 1 to 4.

The scope of the present invention, however, should not be construed to be limited to the preferred embodiment described in the following because it represents only some limited technical features of the invention.

Figure 1:
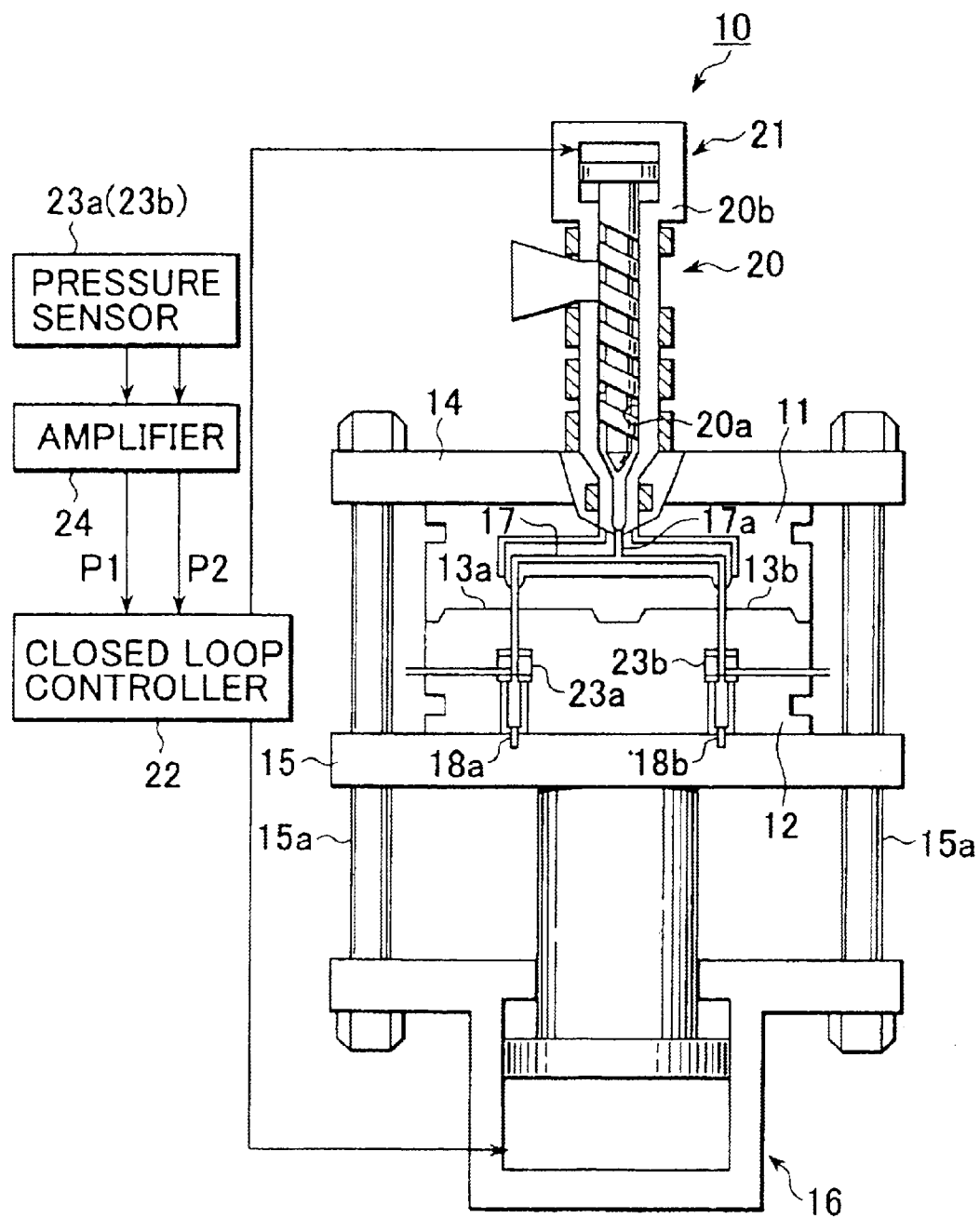
FIG. 1 is a schematic block diagram showing a disc substrate molding apparatus embodying the present invention.

FIG. 1 shows a schematic diagram of a disc substrate molding apparatus applied as a multi-cavity molding machine embodying the present invention.

In FIG. 1, a disc substrate molding apparatus 10 is comprised of a pair of dies 11 and 12, which form a plurality of cavities 13a and 13b (only two cavities are shown in this example) therebetween when they are closed, for injection molding of disc substrates therein.

The die 11 of the pair of dies is stationary relative to a fixed member 14.

Further, the die 12 of the pair of dies is fixed on a movable member 15 which is supported slidably along a tie-bar 15a which extends in a perpendicular direction relative to the above-mentioned fixed member 14. The movable member 15 is urged to move in upward and downward directions, actuated by a hydraulic cylinder 16 provided in the lower direction, thereby enabling an opening and closing of the pair of dies 11 and 12 and a tightening of the dies under a prescribed pressure.

In the above example, it is described that the upper die 11 is a stationary type and the other (lower) die 12 a movable type, however, it is not limited thereto, and both dies may be provided as a movable type.

An injection pipe 17 is provided in the upper die 11 for injecting a molten resin, such as polycarbonate, into the cavities 13a and 13b.

This injection pipe 17 has one opening 17a provided in an upper surface of the die 11 to which the molten resin is poured, as will be described later, and the injection pipe 17 is branched in the die 11 for the respective cavities 13a and 13b and communicates via openings provided in the lower surface of the die 11.

Further, in a region in the die 11 corresponding to the respective cavities 13a and 13b, a stamper (not shown) is held for forming a data-recording surface on one (upper) surface of a disc substrate.

In a center portion in a region inside the aforementioned die 12 corresponding to the respective cavities 13a and 13b, push rod members 18a and 18b are installed and are movable in the upper and lower directions for removing molded disc substrates from the respective cavities 13a and 13b when the die 12 is retracted and opened.

An injection device 20 is connected to the opening 17a of the injection pipe 17 in the die 11. This injection device 20 includes a cylinder 20a and a movable member 20b that is supported movably in upper and lower directions within the cylinder 20a. The movable member 20b is driven by a hydraulic cylinder 21 so as to inject a molten resin from a nozzle of cylinder 20a into the opening 17a of the injection pipe 17 under a prescribed pressure.

Further, the above-mentioned hydraulic cylinders 16 and 21 are driven and controlled by a controller 22, provided as the control device of the invention. The controller 22 is allowed to control and operate either one of the hydraulic cylinders 16 and 21 separately or both of them concurrently in reference to a look-up table acquired in advance.

Still further, respective pressure sensors 23a and 23b as means for detecting a pressure in respective cavities 13a and 13b are incorporated, for example, in the above-mentioned push rod members 18a and 18b.

These pressure sensors 23a and 23b detect pressures in the respective cavities 13a and 13b by utilizing an extrusion pressure exerted on the push rod members 18a and 18b by the molten resin injected therein.

It should be noted, however, that in a case where there exist many cavities in the dies, these pressure sensors need not be provided but in every cavity, but may be provided in a limited, but sufficient as many number of cavities as to ensure the same effect.

Then, detected values of the pressure sensors 23a and 23b are entered into the controller 22 via an amplifier 24. This controller 22 is connected to the hydraulic cylinder 16 and the injection device 20 to control them and, in addition, stores a set of prescribed values regarding the pressure differences among respective cavities necessary for carrying out its control, as will be described later.

The controller 22 may be operated according to a program which is pre-stored or designated from external, or according to an instruction. During injection molding, if a pressure difference between the cavities 13a and 13b is found to have exceeded the prescribed value as a result of detection by the pressure sensors 23a and 23b, this controller 22 controls the operation of the hydraulic cylinder 21 so as to reduce or set to nil a rate of thrust of the movable member 20b as well as the operation of the hydraulic cylinder 16 so as to reduce or set to nil a pressure of thrust of the movable member 15, thereby reducing or nullifying a force of die closing applied between the dies 11 and 12.

Here, a prescribed value used as the criterion by the controller 22, which is the control device for judgement of the result of the above-mentioned detection, is set at a value at which the pressure difference exceeds, for example, 10 $kg/cm^2$ in less than 0.1 second after the start of injection. In this case, by controlling the controller 22, injection of the resin may be stopped and/or the extrusion pressure may be set to nil.

Further, as a countermeasure against damage or breakdown of the dies due to over-packing, upon detection of the pressure difference of the prescribed value described above, the controller 22 is enabled to separately carry out a step of reducing or stopping the rate of thrust of the movable member 20b and a step of reducing or stopping the pressure of the movable member 15. Namely, it may be arranged that only the step of reducing or stopping the injection of the resin is carried out or only the step of reducing or stopping the die closing force applied between the dies 11 and 12 carried out.

Still further, in order to prevent the occurrence of over-packing in advance, it may also be arranged that, without carrying out such sensing of the pressure difference or disregarding the result of such sensing for a first molding after start of operation, a preset program may be used to set up proper injection/pressure conditions and to specify an appropriate injection quantity of the resin and/or an appropriate die closing force at preferred values.

Namely, for example, provided that there exist n cavities, a quantity of resin to be charged at the first molding after start of operation is set at 1/n compared with a quantity thereof at a second or subsequent molding in order to assure for no over-pack to occur at least in the first molding, then, in a subsequent molding, the above-mentioned control on the basis of the pressure difference is followed.

Figure 2:
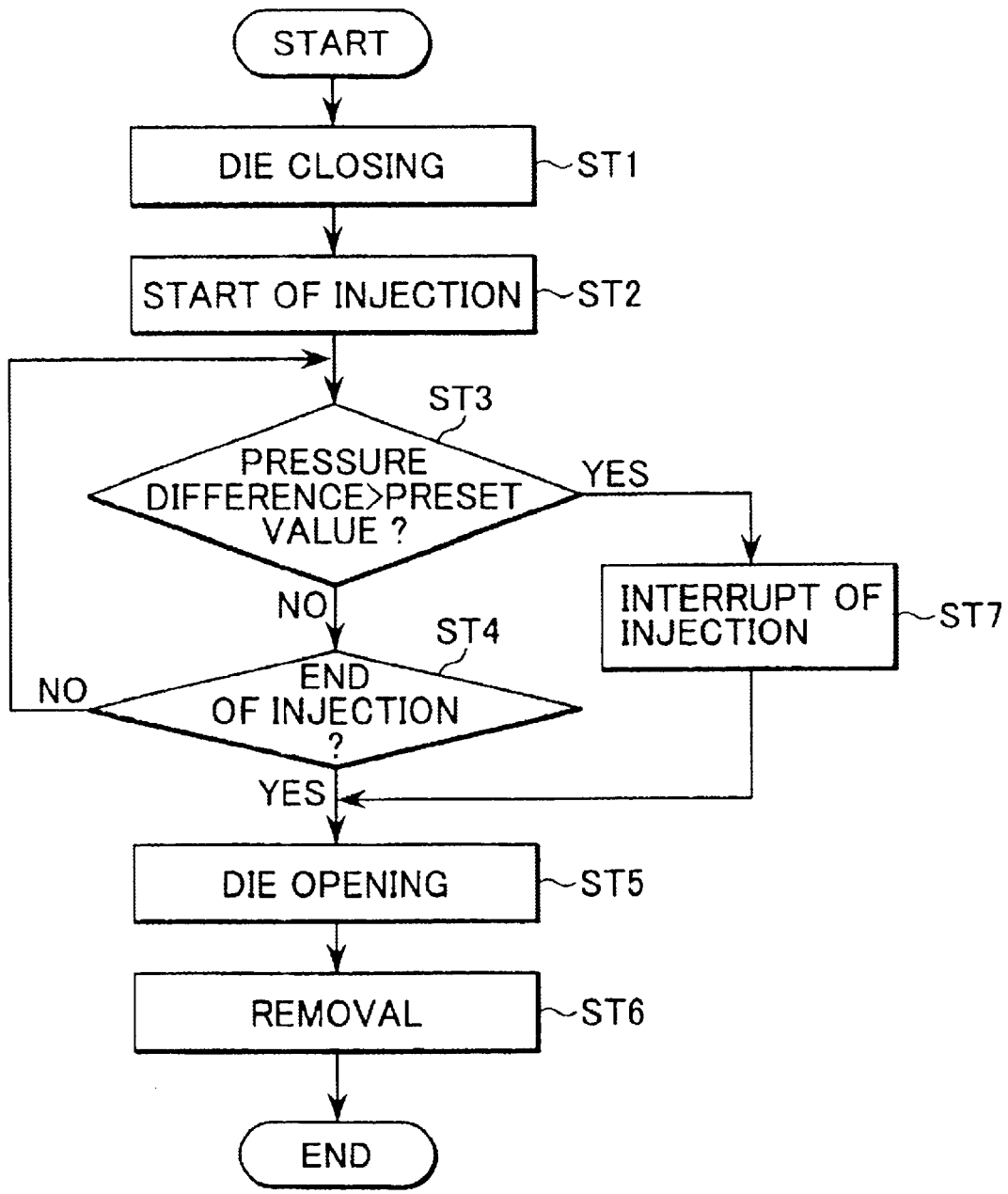
FIG. 2 is a flowchart showing steps of operation of the disc substrate molding apparatus of FIG. 1.

The disc substrate molding apparatus 10 according to one preferred embodiment of the present invention is constructed as described above; and is operated as shown in the flowchart of FIG. 2 when molding disc substrates.

In step ST1, the controller 22 controls the hydraulic cylinder 16 to drive the moving member 15 and the die 12 toward the die 11 until the dies 11 and 12 are closed and tightened with a prescribed force.

Here, if conditions regarding quantities of resin and pressures to be maintained during the first step of molding are stipulated on a program, such conditions on the program are followed prior to ST1 described above. If there is no such a program, control steps subsequent to ST1 dependent on sensing of the pressure difference are carried out.

Namely, in step ST2, the controller 22 controls and drives the hydraulic cylinder 21 to thrust the movable member 20b of the injection device 20 thereby causing a molten resin within the cylinder 20a to be injected from the injection pipe 17 into the respective cavities 13a and 13b formed between the dies 11 and 12.

In step ST3, the controller 22 judges, on the basis of pressures P1 and P2 in the cavities 13a and 13b which are sent from the pressure sensors 23a and 23b via the amplifier 24, that an injection operation is going on normally and should be continued, if its pressure difference $|P1-P2|$, preferably within a prescribed period of time, does not exceed a predetermined value P3 (for example, when its pressure difference does not exceed 10 $kg/cm^2$ within a period of time of 0.1 second from the start of injection).

By way of example, during injection molding, the hydraulic cylinder 21 is driven appropriately controlled by the controller 22 so as to enable adjustment of an injection rate and extrusion pressure of the molten resin, thereby ensuring that the respective cavities 13a and 13b the charged with the molten resin, and thereby accomplishing injection molding of two sheets of disc substrates.

Then, in step ST4, injection of a prescribed amount of the molten resin is completed. Then, in step ST5, after cooling and solidification of the respective disc substrates, the controller 22 controls and drives the hydraulic cylinder 16 so as to open the die 12. Subsequently, in step ST6, the push rod members 18a and 18b are driven to remove respective disc substrates from the respective cavities 13a and 13b, thereby accomplishing the injection molding of the disc substrates according to the present invention.

The aforementioned steps of operation are repeated for a continual injection molding of the disc substrates.

Figure 3:
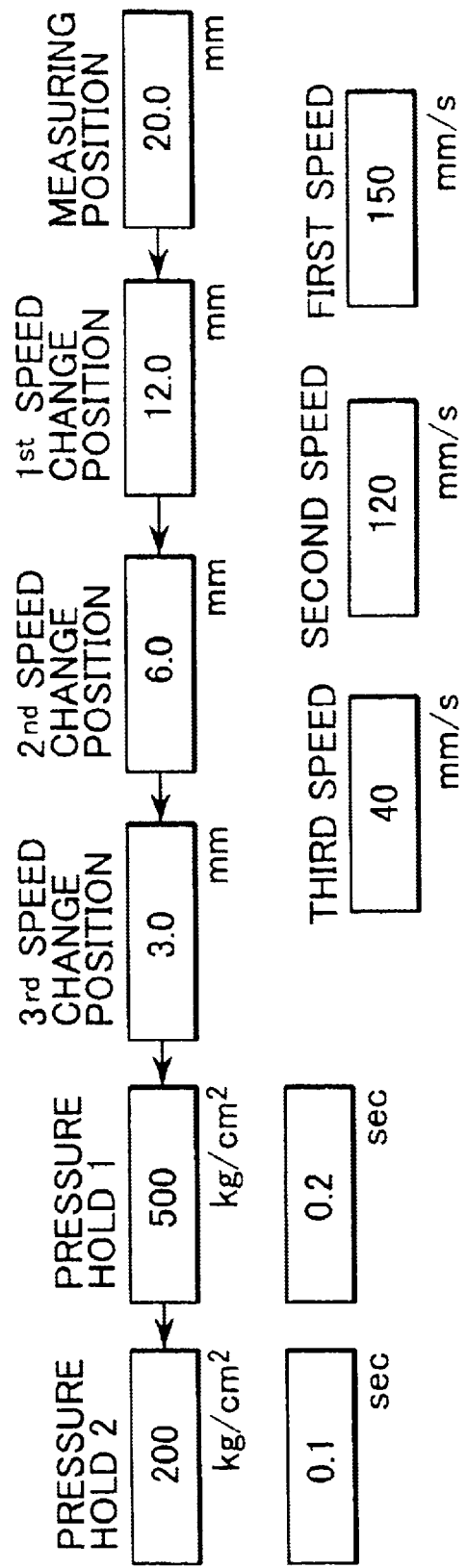
FIG. 3 is a schematic block diagram indicating a specific example of conditions for a continuous operation of the disc substrate molding apparatus of FIG. 1.

More specifically, in this case, controller 22 executes its control for this continual injection operation for molding the disc substrates on the basis of a preset program, as shown in FIG. 3. Namely, the movable member 20b of the injection device 20 is set to start its movement from a position (measuring position) that is retracted by 20.0 mm backward from its front end position; and, then it is set at a first speed (150 mm/s) at a position of 12.0 mm therefrom, set at a second speed (120 mm/s) at a position of 6.0 mm, and at a third speed (40 mm/s) at a position of 3.0 mm. Then, its injection pressure is maintained at 500 $kg/cm^2$ for 0.2 second, and then at 200 $kg/cm^2$ for 0.1 second, under conditions to carry out injection molding of the disc substrates.

Here, in step ST3, if the pressure difference exceeds the prescribed value P3, an abnormality in injection is judged to have occurred, and the controller 22 controls the hydraulic cylinder 21 so as to reduce a rate of thrust of the movable member 20b or stop the same and, at the same time, controls the hydraulic cylinder 16 so as to reduce or set to nil a pressure of the movable member 15, thereby reducing or setting to nil the die closing force applied between the dies 11 and 12. Thereby, the pressure in each cavity is lowered. Then, the injection device 20 is controlled when required to stop injection of the molten resin, thereby interrupting injection molding (step ST7). Then, in step ST5, the dies are parted open. Finally, in step ST6 the molds are removed and, thus, injection molding ends.

Thereby, the occurrence of over-packing in the cavities due to clogging in part of the injection piping 17 communicating to the respective cavities 13a and 13b is prevented in advance.

Then, the die 11 is removed from the stationary member 14, and after the clog or obstruct in the injection piping 17 is removed, the die 11 is attached again to the stationary member 14 to resume the injection molding operation.

In this case, because no infiltration of the molten resin occurs into a parting surface of the dies 11 and 12 as a result of over-packing, disassembly and cleaning of the dies 11 and 12 are not necessary. Also, because no degradation occurs in scale precision in the die closing machine including the stationary member 14, the movable member 15 and the hydraulic cylinder 16, owing to the reduction in the die closing force, no readjustment of the scale precision thereof is required. Still further, the problems of damaging dies 11 and 12 due to over-packing and fall-down and breakage of the stamper are assured to be avoided.

Figure 4:
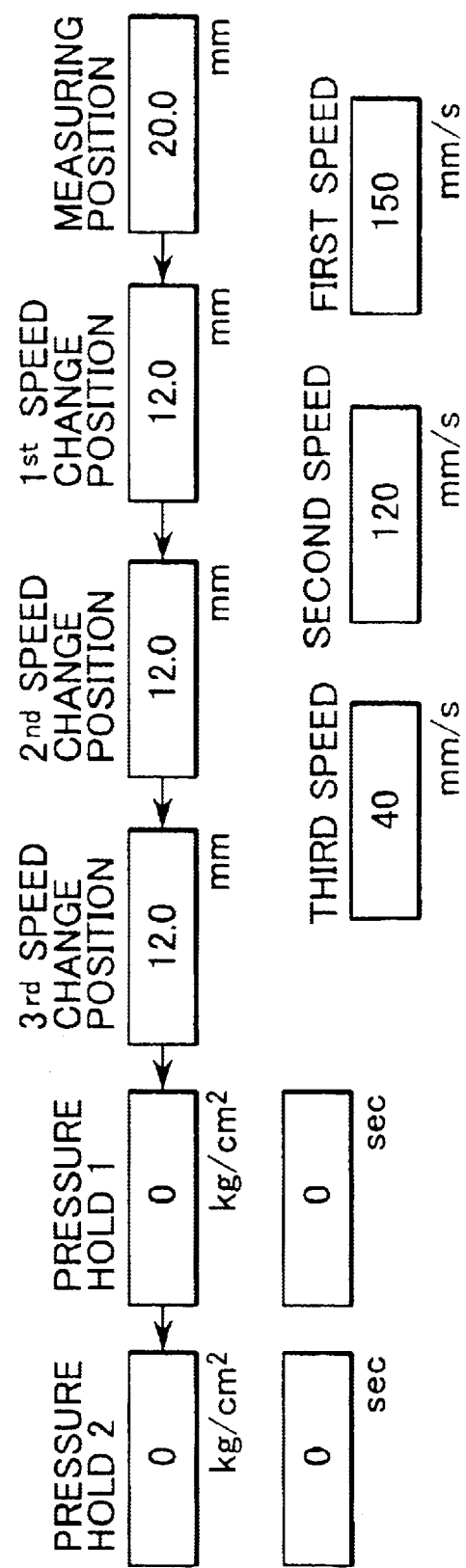
FIG. 4 is a schematic block diagram indicating a specific example of conditions during a start of operation of the disc substrate molding apparatus of FIG. 1.

Furthermore, instead of the above, or in addition thereto, in the initial step of molding immediately after the start of injection molding, the controller 22 may execute a drive control for starting the operation according to a program preset in advance, as shown in FIG. 4. Namely, the movable member 20b of the injection device 20 starts its motion from a position (measuring position) that is recessed by 20.0 mm backward from its front end position, is set at a third speed (40 mm/s) at a position of 12.0 mm therefrom, and then its die closing force is maintained at 0 kg/cm$^2$ at a position of 3.0 mm to proceed with the injection molding of the disc substrates.

In this case, a quantity of the molten resin to be charged at the time of start of operation is set at 1/n or less (provided that there exist n cavities) compared with a quantity thereof to be charged in a continuous operation.

Thereby, the injection device 20 is allowed to inject an amount of the molten resin, for example, prescribed only for one cavity, thereby assuring that no over-pack will occur even if a clog may take place in a portion of the injection piping 17.

In the above description of the embodiment of the present invention, the molding apparatus 10 has been described to have two cavities 13a and 13b; however, it is not limited thereto, and any other modification to provide for three or more cavities may be construed within the scope of the invention.

Still further, in the above description of the embodiment of the invention, the controller 22 has been described to execute its continuous operation according to the preset program shown in FIG. 3 and its starting operation according to the preset program shown in FIG. 4; however, it is not limited thereto, and it may execute its control according to any other control method to the same effect of the invention.

What is claimed is:

1. An injection molding method utilizing an injection molding apparatus having at least a pair of dies that are openable and closable for forming a plurality of cavities therebetween when said pair of dies are closed, into which a molten resin is injected, said method comprising the steps of:

detecting the pressure in each of said plurality of cavities, respectively; and when a pressure difference between said plurality of cavities exceeds a predetermined value, reducing the rate of injection of the molten resin and/or the die closing force.

2. An injection molding method utilizing an injection molding apparatus having at least a pair of dies that are openable and closable for forming a plurality of cavities therebetween when said pair of dies are closed, into which a molten resin is injected, said method comprising the steps of:

detecting the pressure in each of said plurality of cavities, respectively; and when a pressure difference between said plurality of cavities exceeds a predetermined value, stopping injection of the molten resin and/or application of a die closing force.

3. An injection molding apparatus, comprising:

at least a pair of dies that are openable and closable for forming a plurality of cavities therebetween when said pair of dies are closed;

die closing means for closing said pair of dies under a prescribed pressure;

injection means for injecting a molten resin under a prescribed pressure into said plurality of cavities formed between said pair of dies when said dies are closed;

control means for controlling said die closing means and said injection means; and a plurality of pressure detection means for detecting pressure in each of said plurality of cavities, wherein:

said control means controls said injection means and said die closing means in accordance with a detected value from said plurality of pressure detection means, wherein when a pressure difference among said plurality of cavities is found to be greater than a prescribed value, said control means controls the rate of injection of the molten resin and/or the die closing force to be reduced, in accordance with the detected values from said plurality of pressure detection means.

4. An injection molding apparatus, comprising:

at least a pair of dies that are openable and closable for forming a plurality of cavities therebetween when said pair of dies are closed;

die closing means for closing said pair of dies under a prescribed pressure;

injection means for injecting a molten resin under a prescribed pressure into said plurality of cavities formed between said pair of dies when said dies are closed;

control means for controlling said die closing means and said injection means; and a plurality of pressure detection means for detecting pressure in each of said plurality of cavities, wherein:

said control means controls said injection means and said die closing means in accordance with a detected value from said plurality of pressure detection means, wherein when a pressure difference among said plurality of cavities is found to be greater than a prescribed value, said control means stops the injection of the molten resin and/or application of a die closing force, in accordance with the detected values from said plurality of pressure detection means.

5. The injection molding apparatus according to any one of claims 3 or 4, wherein said control means carries out its control in accordance with a program which presets injection conditions at a first molding in an injection molding operation.

6. The injection molding apparatus according to any one of claims 3 or 4, wherein said control means controls the quantity of injection of the molten resin in a first molding instance in its injection molding operation becomes 1/n or less compared with a quantity of injection thereof in a second and subsequent molding instances, provided that there exist n cavities.

* * * * *